United States Patent [19]
Wu

[11] Patent Number: 5,288,099
[45] Date of Patent: * Feb. 22, 1994

[54] TELESCOPIC AND FOLDING FRAME ASSEMBLY FOR A GOLF CART

[76] Inventor: Ching-Chang Wu, No. 35-1, Jih Hsin Street, Tu Cheng Hsiang, Taipei Hsien, Taiwan

[*] Notice: The portion of the term of this patent subsequent to Oct. 5, 2010 has been disclaimed.

[21] Appl. No.: 14,147

[22] Filed: Feb. 5, 1993

Related U.S. Application Data

[63] Continuation-in-part of Ser. No. 991,210, Dec. 15, 1992, Pat. No. 5,249,822.

[51] Int. Cl.$^5$ ................................................ B62B 1/04
[52] U.S. Cl. ..................................... 280/646; 280/655; 280/47.315; 280/DIG. 6
[58] Field of Search ................ 280/42, 646, 652, 654, 280/655, 655.1, 47.24, 47.26, 47.315, 47.33, 47.371, DIG. 5, DIG. 6

[56] References Cited

U.S. PATENT DOCUMENTS

| Re. 33,939 | 5/1992 | Cheng | 280/DIG. 6 X |
|---|---|---|---|
| 4,415,180 | 11/1983 | Payne, Jr. | 280/642 X |
| 4,913,460 | 4/1990 | Klein | 280/646 |
| 5,004,254 | 4/1991 | Wu | 280/47.315 |
| 5,087,040 | 2/1992 | Wu | 280/DIG. 6 X |
| 5,184,911 | 2/1993 | Wu | 280/DIG. 6 X |
| 5,201,540 | 4/1993 | Wu | 280/646 |

FOREIGN PATENT DOCUMENTS

| 2649328 | 1/1991 | France | 280/DIG. 6 |

Primary Examiner—Brian L. Johnson
Attorney, Agent, or Firm—Varndell Legal Group

[57] ABSTRACT

A telescopic and folding frame assembly includes a folding frame bar mounting structure ana a telescopic drag bar mounting structure. The folding frame bar mounting structure includes a frame member having a spaced golf bag cradle for carrying a golf bag with clubs and a bracket to hold a pair of ground supporting wheels by two side beams and a pair of links, and an elongated frame bar having a front end coupled to a drag bar by the telescopic drag bar mounting structure, a rear end coupled with a locking plate hinged to the frame member adjacent to a front connecting rod thereof, wherein a locking plate is pivotably mounted on the elongated frame bar and retained by a spring and stopped by a stop plate to lock the front connecting rod of the frame member to the elongated frame bar in the operative position, each link pivotably interconnects either side wall on the connecting plate and either side beam at a mid portion thereof.

1 Claim, 10 Drawing Sheets

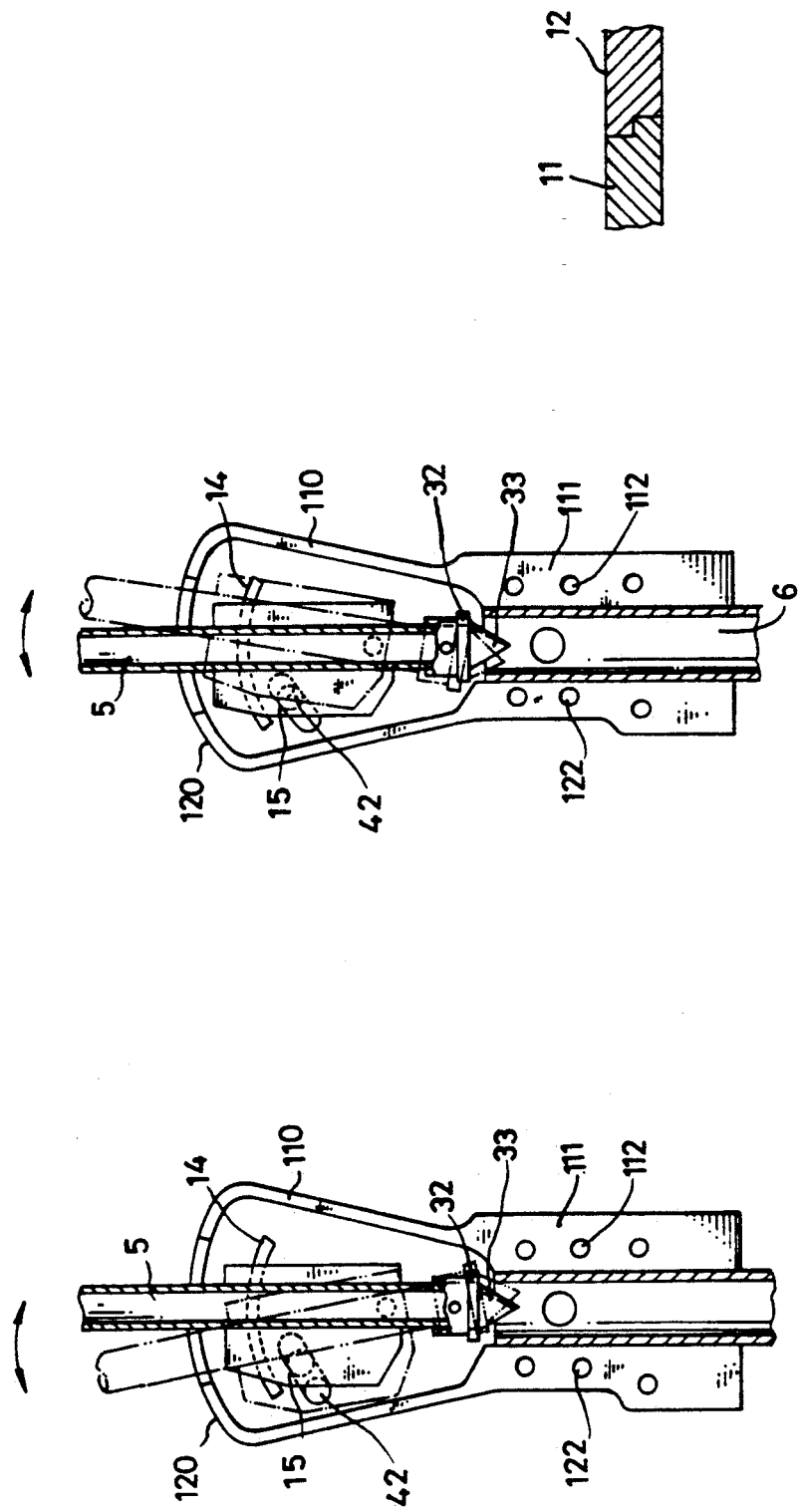

ns099
TELESCOPIC AND FOLDING FRAME ASSEMBLY FOR A GOLF CART

CROSS-REFERENCE TO RELATED APPLICATION

This application is a continuation-in-part of U.S. Ser. No. 07/991,210, filed Dec. 15, 1992, now U.S. Pat. No. 5,249,822.

BACKGROUND AND SUMMARY OF THE INVENTION

The present invention relates to a golf cart for carrying a golf bag with clubs and relates more specifically to a telescopic and folding frame assembly for a golf cart. A known golf cart, as shown in FIG. 1, mainly has a frame member of rectangular configuration, two golf bag cradles mounted on the frame member at two opposite locating for carrying a golf bag with clubs, a bracket mounted on the frame member at a mid portion thereof to hold a pair of ground supporting wheels by two side beams, a frame bar having a front end terminated into a hand grip and a rear end hinged to a front end of the frame member by a hinge means, a locking plate pivotably mounted on the frame bar adjacent to its rear end for locking the frame bar to a front end of the frame member in the operative position, and a pair of links pivotably connected between the rear end of the frame bar and the side beams at mid portions thereof. The locking plate has two retaining notches on two opposite side walls thereof and an unitary hand plate. By turning the hand plate with the hand, the locking plate is alternatively moved into the locking position with the two side pegs on the frame member respectively retained in the retaining notches for permitting the frame bar to be locked in the operative position, or the unlocking position with the two side pegs on the frame member released from the retaining notches for permitting the frame bar to be collasped and closely attached to the frame member side by side. It is found that the locking plate may become loosely connected to the side pegs on the frame member after long use, causing a noise to be produce upon moving of the golf cart. Furthermore, it is difficult to lock the locking plate on the side pegs.

There is another structure of telescopic and collapsible golf cart disclosed in U.S. Pat. No. Re. 33,939, which is generally comprised of a longitudinal frame member including a first section, a second section and a third section terminating in a angle and telescopically receivable within a hollow inner space of the second section; a base frame pivotablly connected to the first section; a bracket secured to the first section; a pair of bag cradles secured to the first and second sections; a hinge means pivotablly and laterally interconnecting the first section to the second section; a link member pivotablly interconnecting the bracket to the hinge means; and second lock means for selectively locking the third section in a desired telescopic position with respect to the second section. In operation, the first section and the second section can be joined in aligned position through the engagement of male and female couplers and further locked in position by menas of a lock member of the hinge means. On the contrary, the arm of the lock member can be swung counterclockwise to release a catch frame out of a hook on the brakcet means, thereby permitting the second section to be swung counterclockwise into a position parallel to the first section. This operation procedure is complicated. Because this structure of telescopic and collapsible golf cart consists of a great number of parts, its assembly process is complicated, and its manufacturing cost is high. Still another disadvantage of this structure of a telescopic and collapsible golf cart is that most parts of the golf cart may rust away easily because they are made from iron or rigid metal materials.

It is therefore an object of the present invention to provide a telescopic and folding frame assembly for a golf cart which can be conveniently folded up into the collapsed condition or set up into the operative condition. It is another object of the present invention to provide a telescopic and folding frame assembly for a golf cart which can be firmly locked in position to eliminate noises as the golf cart is moved. With these objects in view, the locking plate in the folding frame bar mounting structure according to the preferred embodiment of the present invention is pivotably mounted on the frame bar and retained by a spring and stopped from forward swinging by a stop plate. The locking plate has a back opening on a back wall thereof and a guide slope on a top wall thereof for guiding a front connecting rod on the frame member into or out Of a lock hole defined within the locking plate for permitting the front connecting rod of the frame member to be retained by the locking plate in the locking position or released from the locking plate. The back opening on the locking plate allows the locking plate to be turned backwards from the locking position to the unlocking position for permitting the front connecting rod of the frame member to be inserted into the lock hole of the locking plate or released therefrom.

BRIEF DESCRIPTION OF THE DRAWINGS

FIGS. 10A and 10B illustrate the operation of the present invention to adjust the position of the drag bar.

FIG. 11 is a sectional end view illustrating the connection of the two opposite mounting shells of the mounting device of the telescopic drag bar mounting structure.

DETAILED DESCRIPTION OF THE PREFERRED EMBODIMENT

Referring to FIGS. 5 through 11, a folding frame assembly for a golf cart as constructed in accordance with the present invention generally comprised of a folding frame bar mounting structure and a telescopic drag bar mounting structure.

Figure 9:
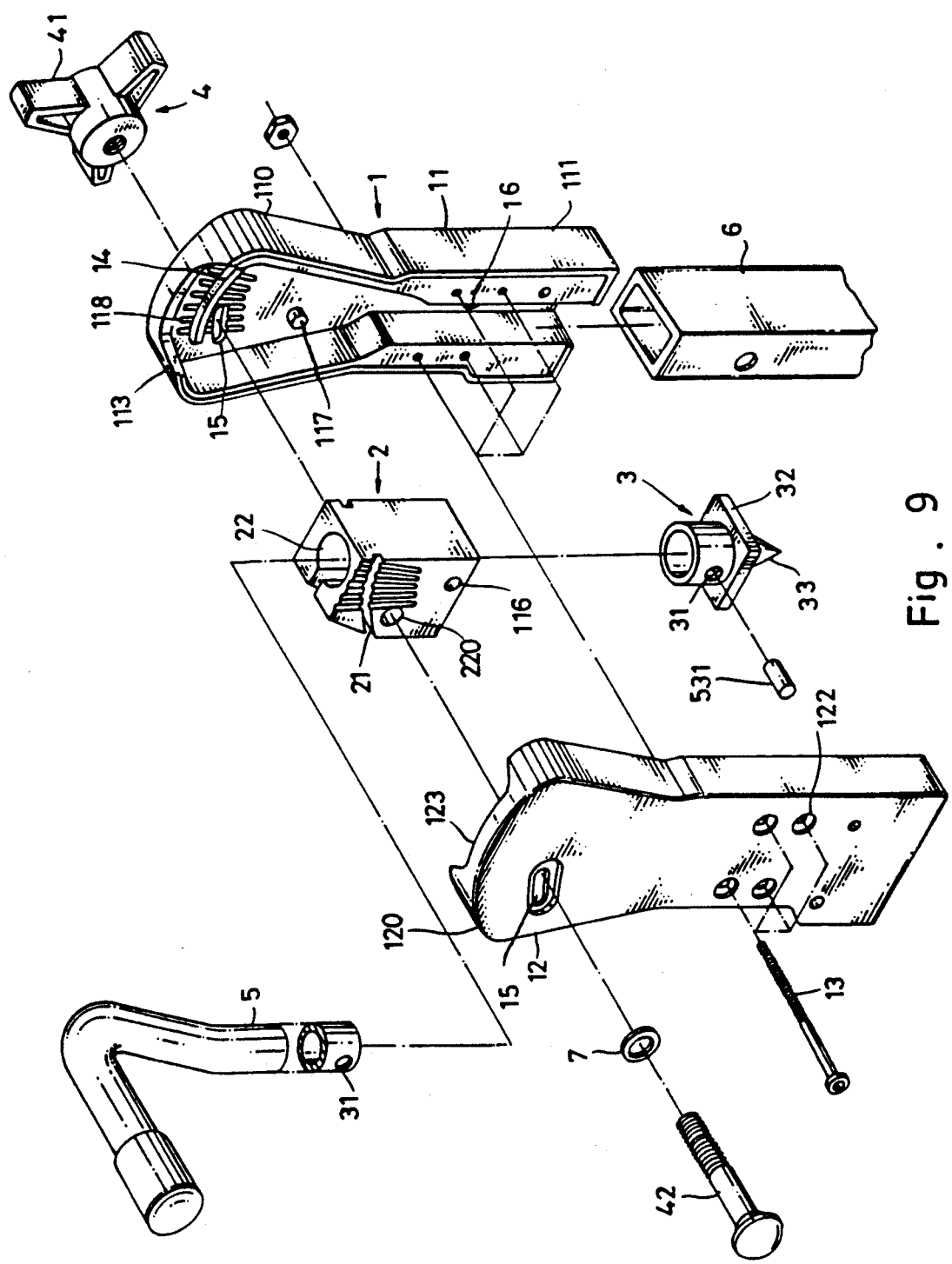
FIG. 9 is a perspective exploded view of the telescopic drag bar mounting structure of the telescopic and folding frame assembly of FIG. 5.

Referring to FIGS. 9, 10 and 11, the telescopic drag bar mounting structure is generally comprised of a mounting device 1, a swinging block 2, a positioning member 3, an adjusting device 4, a drag bar 5 and a frame bar 6 . The mounting device 1 is comprised of two opposite mounting shells 11, 12 and a plurality of fastening elements 13. The two opposite mounting shells 11, 12 comprise each an unitary, rectangular connecting portion 111 or 121 vertically extending downward from a substantially U-shaped holder portion 110 or 120 for connecting a frame bar 6 which is a part of the frame of a golf cart to which the drag bar of the present invention is secured. A plurality of mounting holes 112 or 122 are made on the connecting portion 111 or 121 of each of the two opposite mounting shells 11, 12 so that corresponding quantity of fastening elements 13 can be inserted therethrough to secure the two opposite mounting shells 11, 12 together. An unitary pin 16 extends from the inner wall of the connecting portion 111 or 121 of each mounting shell 11 or 12 for fastening in the frame bar 6. The holder portion 110, 120 of the two opposite mounting shells 11, 12 have each a notch 113 or 123 on its topmost edge, and a transversely curved, raised strip 14, a circular guide position 117, a rectangular hole 15 and a plurality of radial, convex strips 118 on its inner wall, a first bag cradle 84 on the end of mounting shells 11, 12. The swinging block 2 is a substantially elongated block unitarily made of resilient plastic material through and laterally process having a key hole 22 vertically and laterally piercing therethrough, a guide post hole 116 transversely piercing therethrough at a lower position, a pivot hole 220 transversely piercing therethrough at a higher position near one lateral side, two curved grooves 21 transversely made on its two opposite side walls, and a plurality of concave strips 119 radially made on its two opposite side walls and respectively intersecting with the two curved grooves 21. The two curved grooves 21 are made in width slightly wider than the thickness of the transversely curved, raised strips 14 of the two opposite mounting shells 11, 12. The positioning member 3 comprises a tubular body having a conical bottom end 33, a rectangular flange 32 and a rivet hole 31 . After the swinging block 2 is mounted on the drag bar 5, the positioning member 3 is inserted in the drag bar 5 and fixedly secured therein by means of a rivet 531 which is fastened in the drag bar 5 through a rivet hole 31. The adjusting device 4 is comprised of a swivel knob 41 and a screw rod 42. The screw 42 is inserted from the rectangular hole 15 of a first mounting shell 11 or 12 through through the pivot hole 220 of the swinging block 2 and the rectangular hole 15 of the other mounting shell 11 or 12 to connect with the swivel knob 41. During the fastening of the adjusting device 4, a washer 7 is mounted on the screw rod 42 to reduce possible wearing problem. By means of the control of the adjustiang device 4, the swinging block 2 can be firmly squeezed or released so that the positioning of the drag bar 5 inside the two holer portions 110, 120 of the two opposite mounting shells 11, 12 and relative to the frame bar 6 can be conveniently adjusted. By means of the control of the swivel knob 41, the position of the drag bar 5 is adjusted.

Referring to FIGS. 5, 6, 7 and 8, the folding frame bar mounting structure is generally comprised of a frame member 8 having a front end terminated in a front connecting rod 82 and fastened with a locating plate 64 and a hinge means 81 , and the elongated frame bar 6 of the aforesaid telescopic drag bar mounting structure having a top end coupled to the drag bar 5 and a bottom end fastened with a stop plate 63, a locking plate 64 and a connecting plate 65. The elongated frame bar 6 also has a scoreboard 62 mounted on a middle part thereof for recording the record of points made in play. The connecting plate 65 on the elongated frame bar 6 is pivotably connected between two side arms 811 of the hinge means 81. The stop plate 63 has a top projection 163 extended from a rear end thereof, which has a top edge 6312 spaced from the casing 641 of the locking plate 64 by a space for inserting the front connecting rod 82 of the frame member 8 and two side edges 6311 on a top wall thereof spaced from the bottom projection 631 for fastening one end 661 of a spring 66. The spring 66 has an opposite end 662 fastened to a post 6411 inside the locking plate 64. The casing 641 of the locking plate 64 has two opposite sides 642 pivotably and bilaterally mounted on the elongated frame bar 6, a top wall 644 terminated into a guide slope 6441 through which the end edge 821 of the front connecting end 82 of the frame member 8 is smoothly moved into the space defined inside the casing 641 of the locking plate 641 and a front opening 6412 for allowing the casing 641 of the locking plate 64 to be swung on the elongated frame bar 6 within a predetermined angle. The connecting plate 65 has two bottom projections 651, 652 pivotably connected with two links 67. The frame member 8 has a second bag cradle 86 on its end for carrying a golf bag with clubs, and a bracket 83 on the middle to hold two ground supporting wheels (not shown) by two side beams 831. Each link 67 has one a front end 671 pivotably mounted on either bottom projections 651 or 652 on the connecting plate 65 and a rear end pivotably mounted on either side beam 831 at a middle portion thereof.

Figure 1:
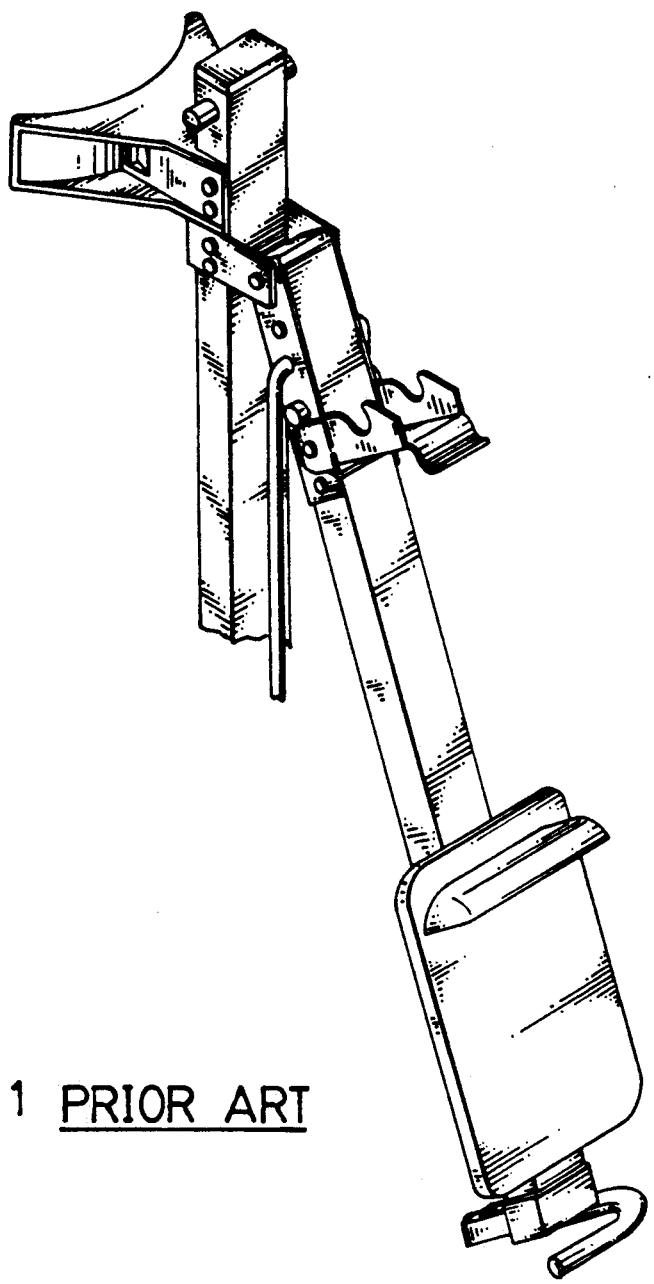
FIG. 1 is a perspective view of a folding frame assembly for a golf cart according to the prior art.
Figure 2:
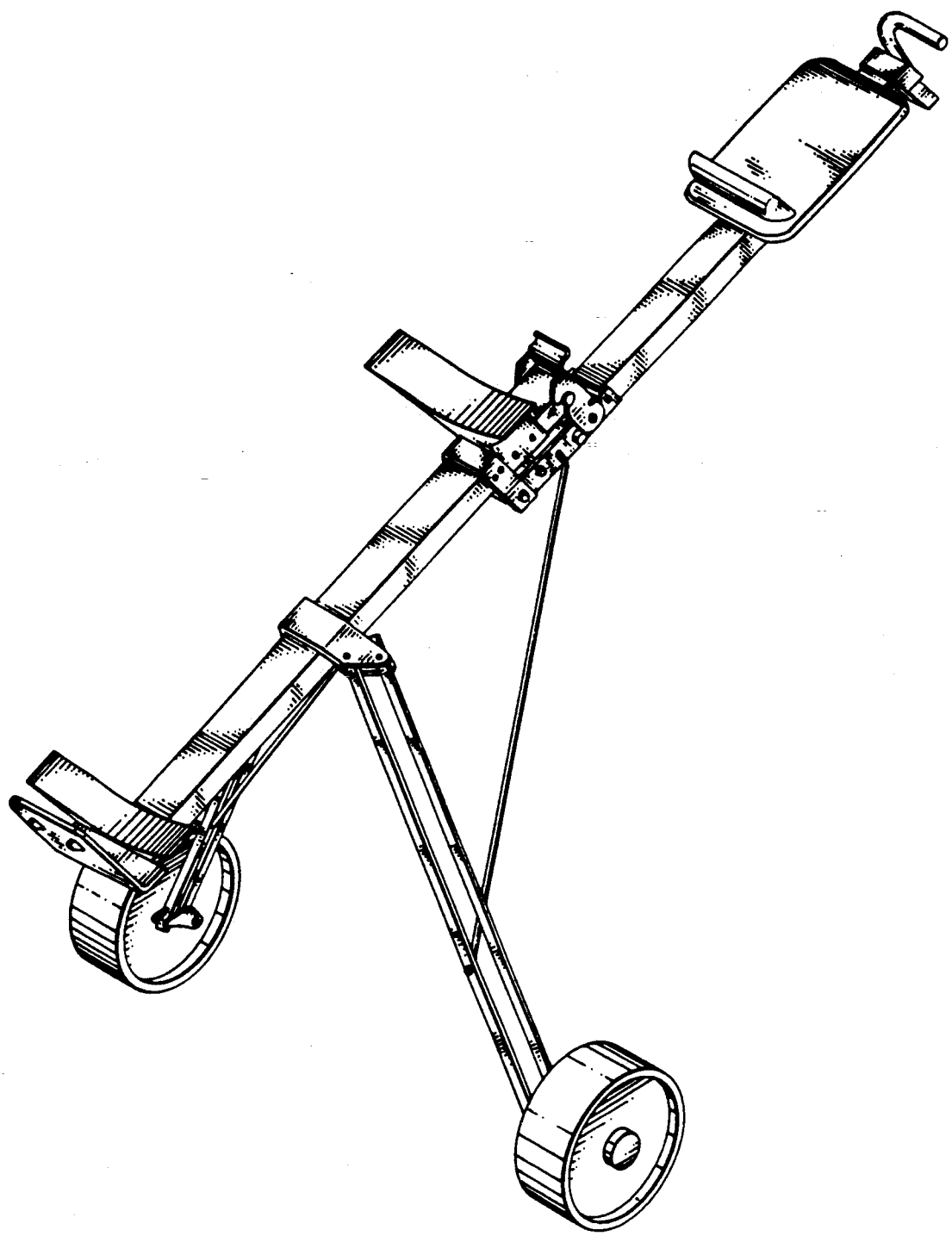
FIG. 2 is a perspective elevational view of the golf cart according to FIG. 1.
Figure 3:
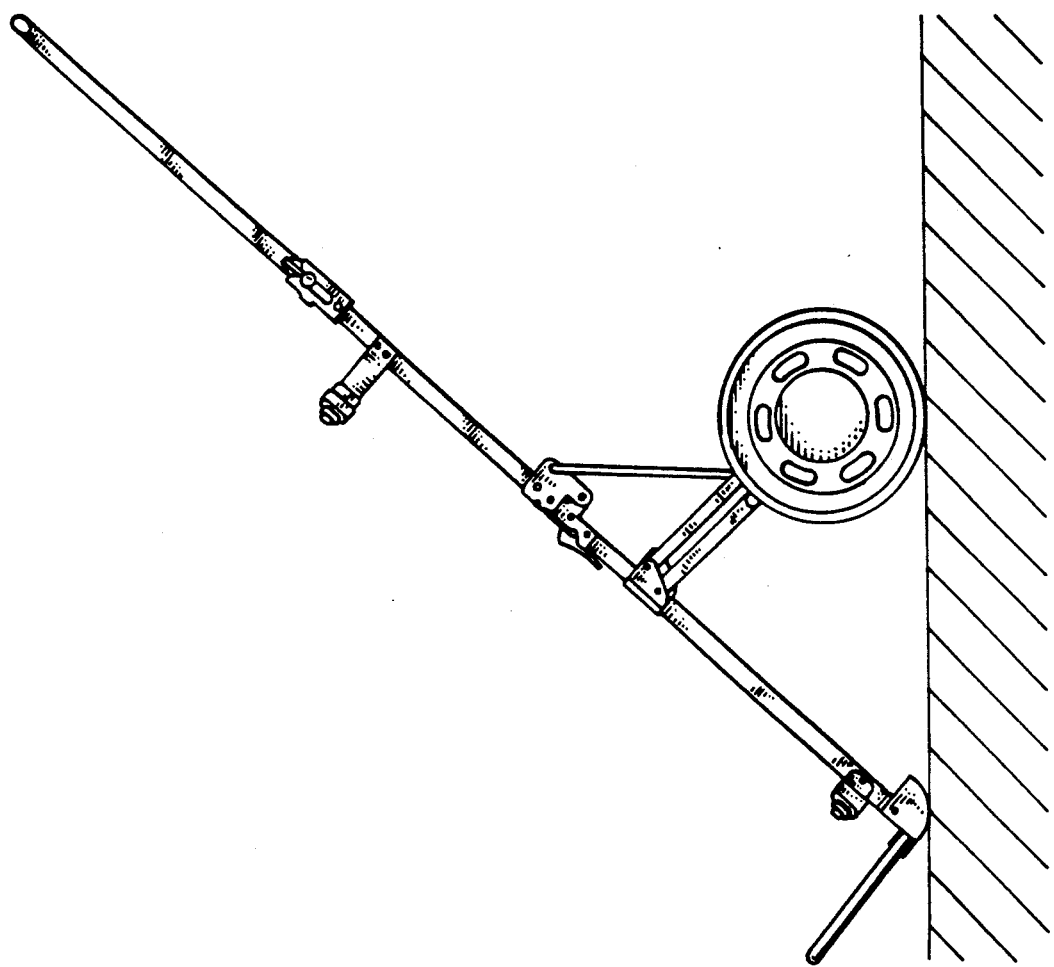
FIG. 3 is a side view of a telescopic and collapsible golf cart as disclosed in U.S. Pat. No. Re. 33,939.
Figure 4C:
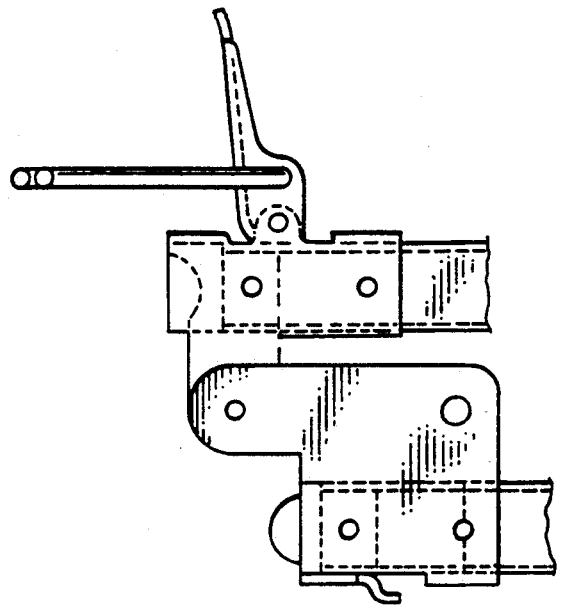
FIGS. 4A, 4B and 4C illustrate the structure and operation of the collapsible frame of the telescopic and collapsible golf cart of FIG. 3.
Figure 4B:
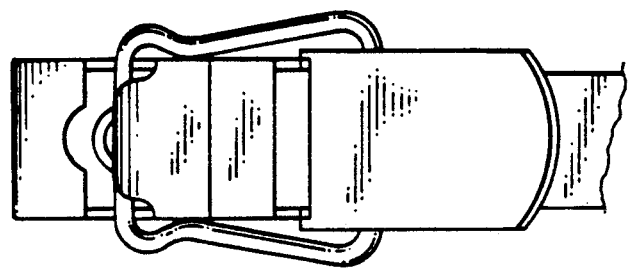
Figure 4A:
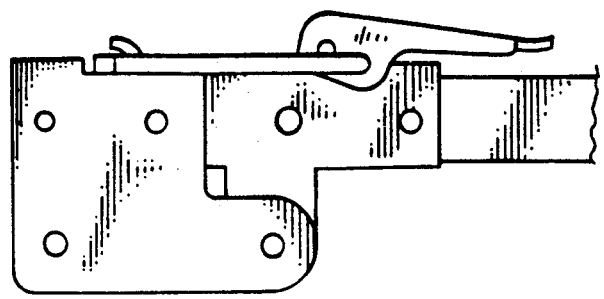
Figure 5:
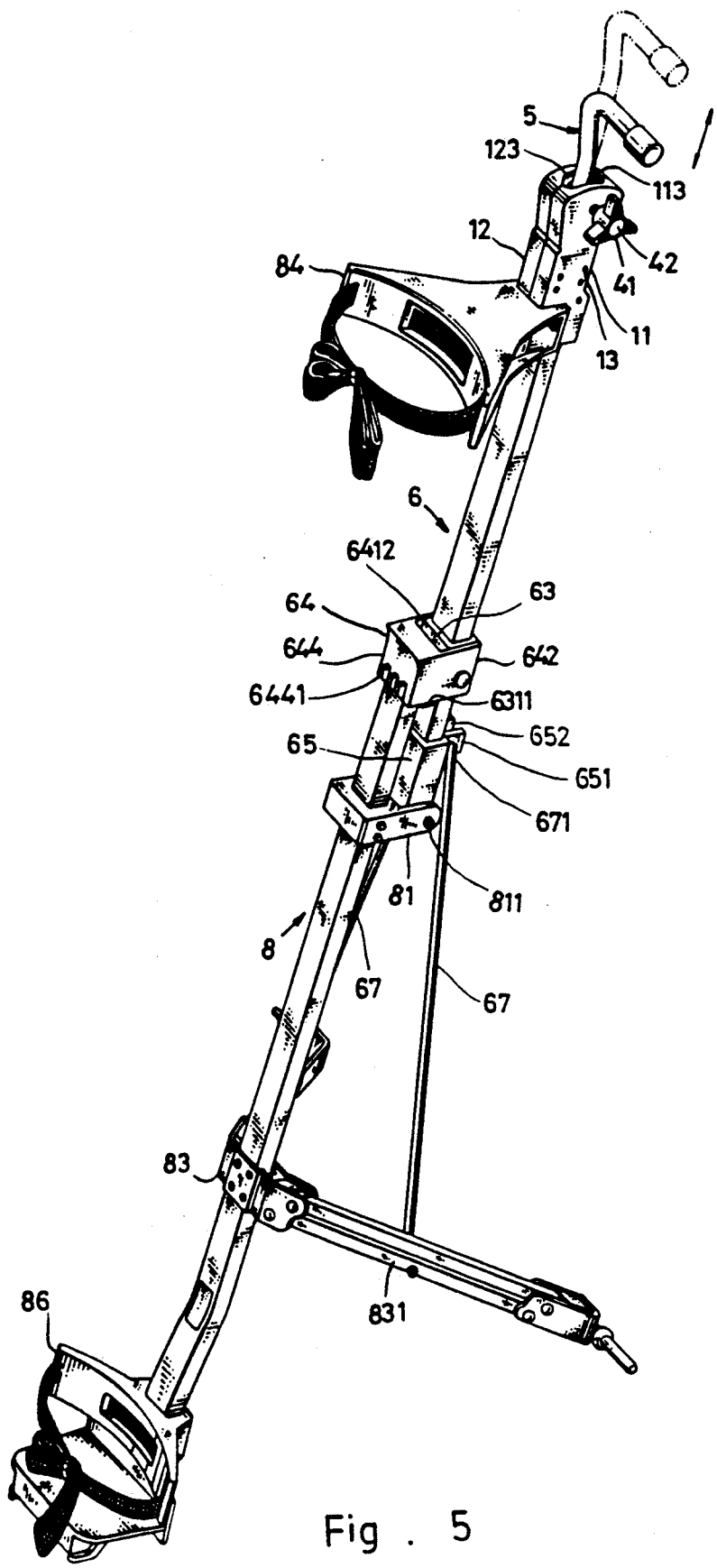
FIG. 5 is a perspective elevational view of a telescopic and folding frame assembly for a golf cart according to the present invention.
Figure 6:
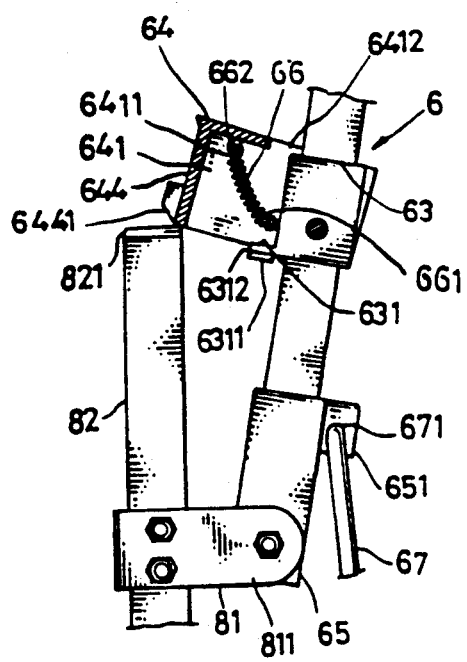
FIG. 6 is a side view of the folding frame bar mounting structure of the telescopic and folding frame assembly of FIG. 5 showing the front connecting rod of the frame member moved out of the locking plate on the elongated frame bar.
Figure 7A:
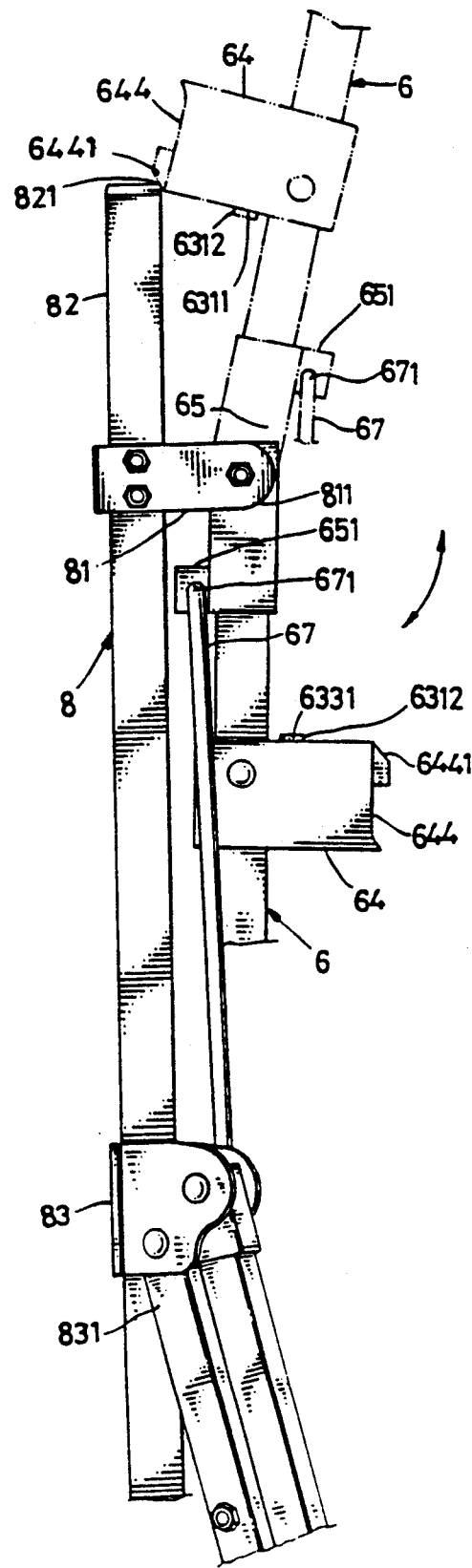
FIGS. 7A and 7B illustrate the operation of the present invention to fold up the folding frame mounting structure.
Figure 7B:
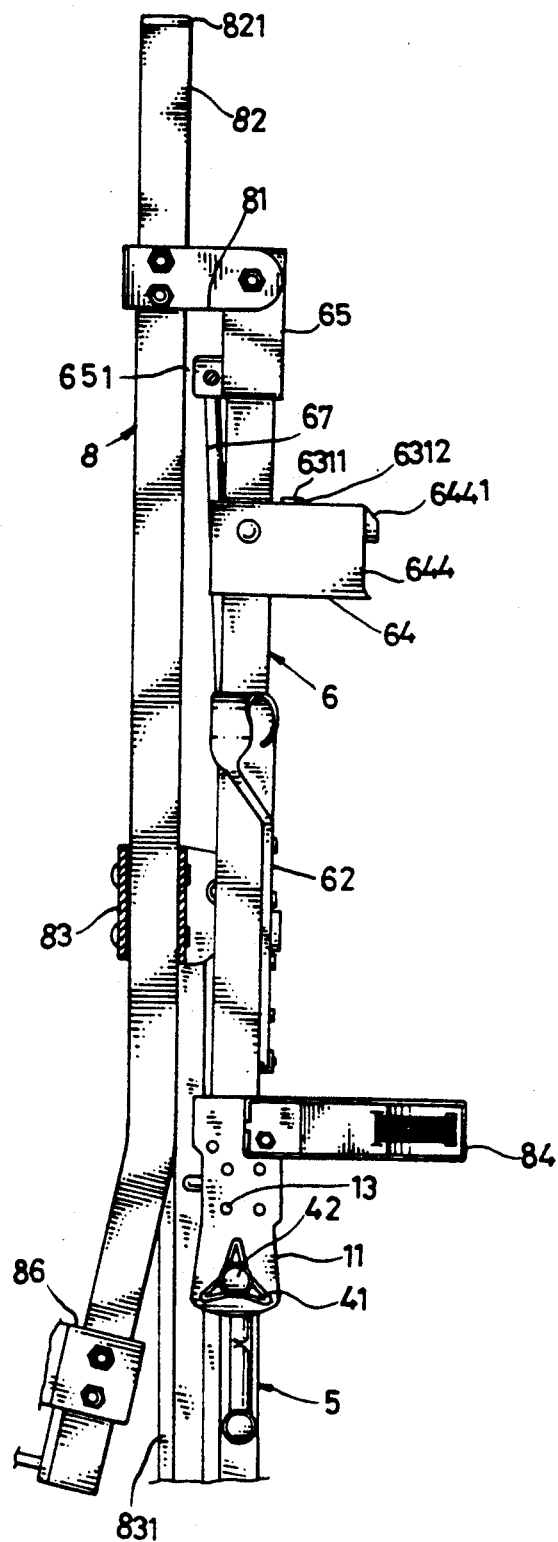
Figure 8:
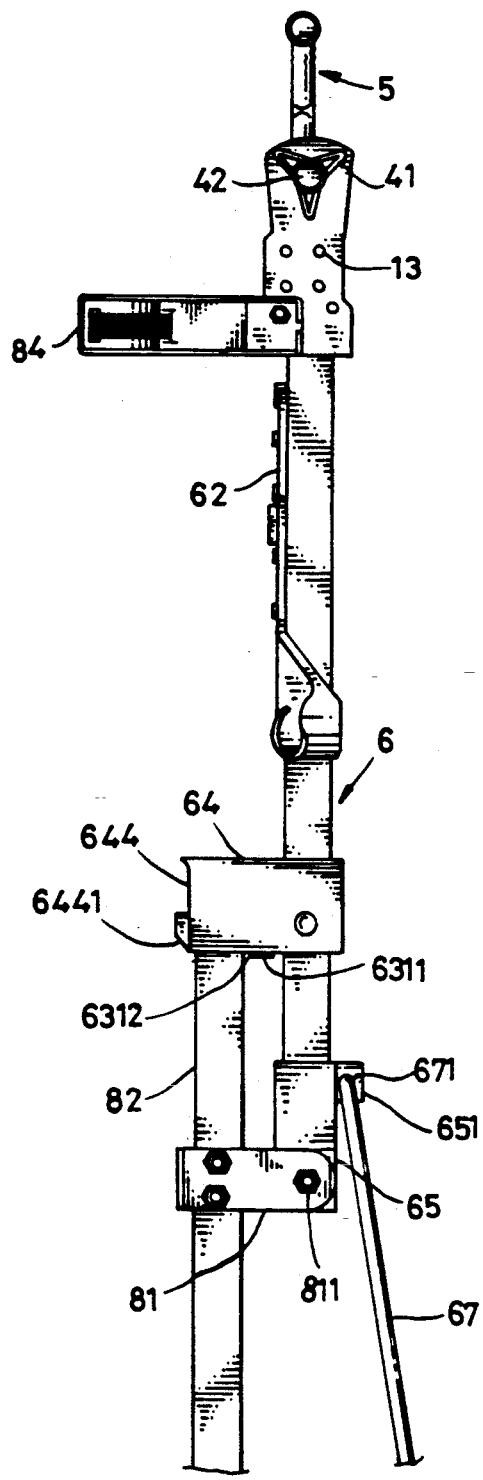
FIG. 8 illustrates the folding frame bar mounting structure of FIG. 6 locked in the operative position.

The folding frame bar can be conveniently folded up into the collapsed, non-operative condition by turning the locking plate 64 backwards on the elongated handle frame 6 from the front connecting rod 82 of the frame member 8 for permitting the front connecting rod 82 of the frame member 8 to be disconnected from the stop plate 63 and the locking plate 64 (see FIG. 6), nd then turning the connecting plate 65 of the elongated frame bar 6 backwards on the hinge means 81 through 180° angle for permitting the links 67, the side beams 831 and the elongated frame bar 6 to be respectively collapsed and closely attached to the frame member 8 (see FIGS. 7A and 7B). The folding frame bar can also be conveniently opened from the collapsed, non-operative condition into the operative condition and locked in position by turning the elongated frame bar 6 on the hinge means 81 in the reverse direction and permitting the end edge 821 of the front connecting rod 82 of the frame member 8 to be guided by the guide slope 6441 into the inside space of the casing 641 of the locking plate 64. Once the front connecting rod 82 of the frame member 8 was inserted into the inside space of the casing 641 of the locking plate 64, the locking plate 64 is automatically moved back to its former position by the spring 66 to lock the frame bar 6 to the frame member 8 in the operative position. Because of the arrangement of the stop plate 63 and the spring 66, the locking plate 64 is allowed to be swung on the elongated frame bar 6 within a predetermined angle. Because the links 67 are pivoted to the two bottom projections 651, 652 of the connecting plate 65 but not directly pivoted to the elongated frame bar 6, they can be conveniently collapsed when the elongated frame bar 6 is folded up. Because the elongated frame bar 6 is locked to the frame member 8 by the locking plate 64, moving the golf cart does not cause the elongated frame bar 6 to displace, and therefore no noise is produced while moving the golf cart. Because the stop plate 63, the locking plate 64, the connecting plate 65 and the hinge means 81 are respectively made from a plastic material through the process of injection molding, they do not rust away.

I claim:

1. A telescopic and folding frame assembly for a golf cart comprising:

an elongated frame bar having a front end connected to a telescopic drag bar mounting structure and a rear end coupled with a connecting plate, said telescopic drag bar mounting structure comprising:

a drag bar having a handhold on a top end for holding by hand, a mounting device for securing said drag bar to said elongated frame bar, including two opposite mounting shells connected together by means of a plurality of fastening elements, said two opposite mounting shells each having a unitary pin extending from an inner wall surface at a lower position thereof, a circular guide post extending inwardly from the inner wall surface at a middle position thereof, a notch on a topmost edge, a transversely curved and raised strip on the inner wall surface near the topmost edge, a rectangular hole transversely piercing the inner wall surface, a plurality of radial and convex strips on the inner wall surface, and a first bag cradle on an end of the mounting shells, a swinging block made of resilient plastic material through a shape molding process and having a key hole extending vertically through the length, a plurality of concave strips radially arranged on a portion of opposing sides of said swinging block, a groove extending through said swinging block and intersecting said strips, a guide post hole horizontally passing through a lower position of said swinging block beneath said concave strips, and a pivot hole horizontally passing through said swinging block above said guide post hole and adjacent said strips, a positioning member secured to a bottom end of said drag bar by means of a rivet joint and having a conical bottom end inserted in a top of said frame bar and a rectangular flange for preventing said drag bag from moving away from said mounting device, and an adjusting device including a screw rod inserted through said rectangular hole of said two opposite mounting shells and said pivot hole of said swinging block, and connected with a swivel knob, said adjusting device permitting said mounting device to squeeze said swinging block for retaining said drag bar in position;

a frame member having a second bag cradle cooperating with said first bag cradle for carrying a golf bag with clubs, a bracket to hold two ground supporting wheels by two side beams, a hinge means spaced from a front connecting rod thereof pivotably connected to the connecting plate on said elongated frame bar, and a pair of links pivotably interconnecting the side beams at mid portions thereof and the connecting plate on said elongated frame bar; and wherein said connecting plate of said elongated frame bar is pivotably connected between two side walls on said hinge means, having two bottom projections pivotably connected to either link; said elongated frame bar has a stop plate connected thereto to stop a locking plate from pivoting forward for permitting said locking plate to be retained in a locking position; said locking plate is pivotably mounted on said elongated frame bar and retained by a spring means, having a back opening on a back wall thereof and a guide slope on a top wall thereof for guiding said front connecting rod of said frame member into or out of a lock hole defined inside said locking plate for permitting said front connecting rod of said frame member to be retained by said locking plate in said locking position or released from said locking plate, the back opening on said locking plate allowing said locking plate to be turned backwards from said locking position to an unlocking position for permitting said front connecting rod to said frame member to be inserted into said lock hole of said locking plate or released therefrom; the folding frame assembly is folded up into a collapsed, nonoperative condition by pivoting said locking plate backwards on said elongated frame bar from said front connecting rod of said frame member for permitting said front connecting rod of said frame member to be disconnected from said locking plate, and then pivoting said connecting plate of said elongated frame bar backwards on said hinge means through an 180° angle for permitting said links and said side beams and said elongated frame bar to be respectively collapsed and closely attached to the frame member; the folding frame assembly is extended out from the collapsed, non-operative condition into an operative condition and locked in place by pivoting said elongated frame bar on said hinge means in the reverse direction and permitting said front connecting rod of said frame member to be guided by said guide slope into said lock hole of said locking plate.

* * * * *